(12) United States Patent
Marupaduga et al.

(10) Patent No.: US 9,706,502 B1
(45) Date of Patent: Jul. 11, 2017

(54) DYNAMICALLY MODIFYING POWER HEADROOM TIMERS BASED ON COMMUNICATION SERVICE TYPE

(71) Applicant: Sprint Communications Company L.P., Overland Park, KS (US)

(72) Inventors: Sreekar Marupaduga, Overland Park, KS (US); Rajveen Narendran, Olathe, KS (US); Nitesh Manchanda, Overland Park, KS (US); Vanil Parihar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/057,881

(22) Filed: Mar. 1, 2016

(51) Int. Cl.
*H04W 72/00* (2009.01)
*H04W 52/26* (2009.01)
*H04W 52/36* (2009.01)
*H04W 72/04* (2009.01)

(52) U.S. Cl.
CPC ....... *H04W 52/265* (2013.01); *H04W 52/365* (2013.01); *H04W 72/0433* (2013.01)

(58) Field of Classification Search
CPC ... H04W 24/10; H04W 72/085; H04W 72/04; H04W 48/12; H04W 52/242
USPC ........................... 455/450, 451, 452.1, 452.2
See application file for complete search history.

(56) References Cited

U.S. PATENT DOCUMENTS

| | | | |
|---|---|---|---|
| 2015/0003371 A1* | 1/2015 | Park | H04W 52/0238 370/329 |
| 2016/0066284 A1* | 3/2016 | Kwon | H04W 52/365 370/329 |

* cited by examiner

*Primary Examiner* — Tu X Nguyen (57) ABSTRACT

The technology disclosed herein enhances the operation of a Long Term Evolution (LTE) access node to dynamically modify power headroom (PHR) timers. In one implementation, a method of operating a LTE access node includes communicating first signals with wireless communication devices (WCDs) using a first PHR timer. The method also includes identifying if signal service quality with the WCDs meets performance criteria and, if the signal service quality meets the criteria, identifying a set of wireless devices based on service type for the set of wireless devices, identify a second PHR timer for the set of wireless devices, and transfer the second PHR timer to the set of wireless devices.

19 Claims, 7 Drawing Sheets

| PHR TIMER DATA STRUCTURE 500 | | |
|---|---|---|
| SERVICE IDENTIFIER 510 | PHR PROHIBIT TIMER 520 | PHR PATH LOSS 521 |
| SERVICE | VALUE | VALUE |
| SERVICE | VALUE | VALUE |
| SERVICE | VALUE | VALUE |
| SERVICE | VALUE | VALUE |

FIGURE 5

FIGURE 6

DYNAMICALLY MODIFYING POWER HEADROOM TIMERS BASED ON COMMUNICATION SERVICE TYPE

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some Long Term Evolution (LTE) communication systems, wireless communication devices may provide power headroom (PHR) notifications to LTE access nodes, which indicate how much relative power is left to transmit data in addition to the power being used in the current transmission. These notifications are transferred from the devices over intervals specified by the LTE access node, wherein the LTE access node can dictate periodic intervals for the transmission of the PHR notifications. In particular, the LTE access node may provide PHR prohibit values that specify the minimum number of packets that must be transmitted between PHR notifications, and/or PHR path loss values that can trigger a PHR transmission when the downlink path loss for a wireless device passes a defined threshold. However, although an LTE access node may specify the intervals at which devices may transmit PHR notifications, current LTE access nodes are incapable of dynamically providing PHR interval rules based on network conditions and the types of communications for the wireless devices.

OVERVIEW

The technology disclosed herein enhances the ability of Long Term Evolution (LTE) networks to dynamically modify power headroom (PHR) timers. In one implementation, a method of operating a LTE access node to dynamically modify PHR timers includes receiving wireless signaling from a plurality of wireless communication devices using a first PHR timer. The method further provides identifying a signal service quality for the plurality of wireless communication devices based on the wireless signaling and determining whether the signal service quality meets performance criteria. The method also includes, if the signal service quality meets the performance criteria, identifying a set of wireless communication devices in the plurality of wireless communication devices based on at least one service type for the set of wireless communication devices, identifying a second PHR timer for the set of wireless communication devices based on the at least one service type, and providing the second PHR timer to the set of wireless communication devices.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
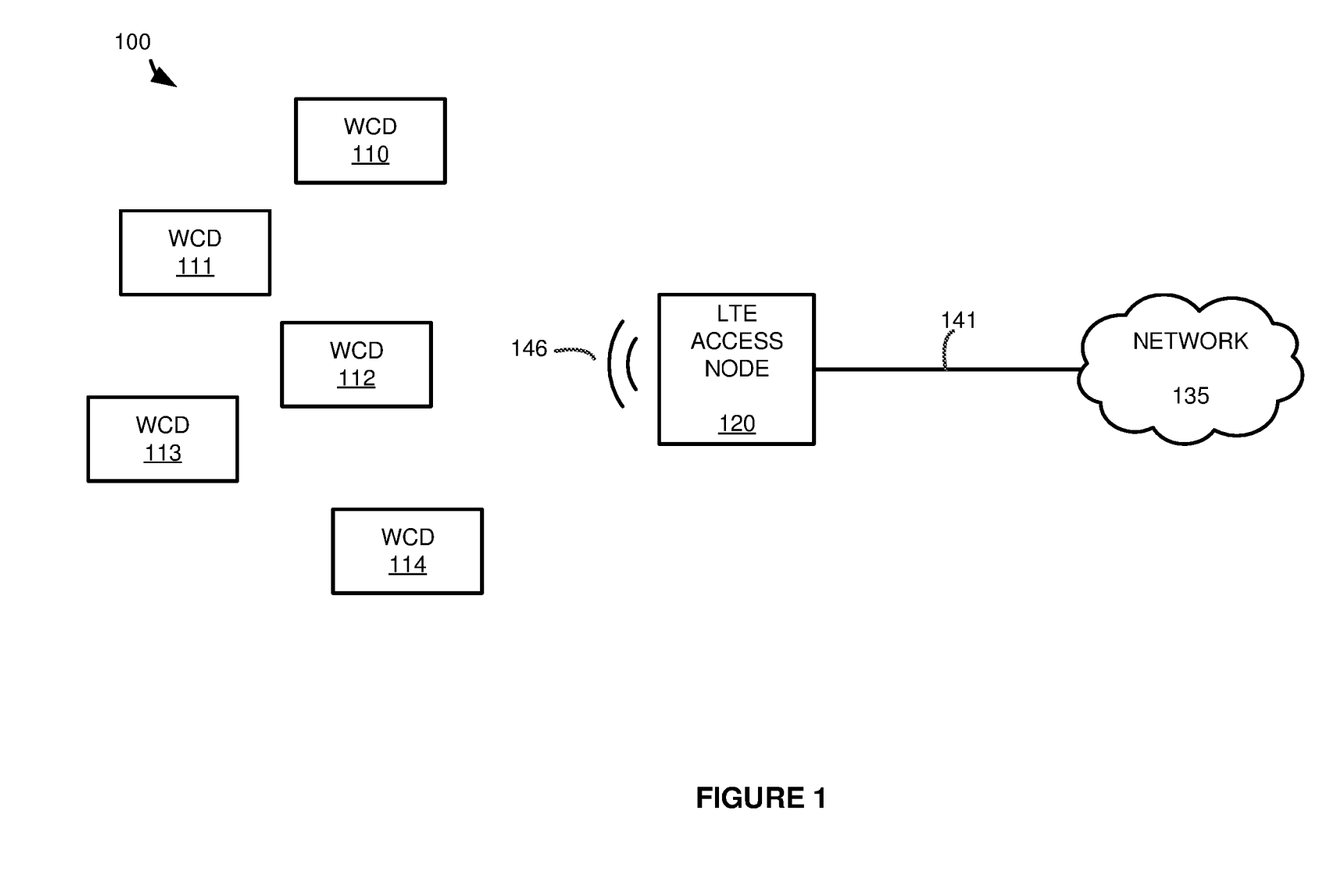
FIG. 1 illustrates a communication system to dynamically modify power headroom timers based on service types for wireless communication devices.

FIG. 1 illustrates a communication system 100 to dynamically modify power headroom timers based on service types for wireless communication devices. Communication system 100 includes wireless communication devices (WCDs) 110-114, Long Term Evolution (LTE) access node 120, and network 135. LTE access node 120 is representative of an eNodeB or some other LTE access point for a LTE service provider. Network 135 may include various gateways, routers, and other elements for the wireless service provider, and may further include routers and gateways of the Internet or some other packet data network. LTE access node 120 provides LTE signaling 146 to WCDs 110-114, and further communicates with network 135 via communication link 141.

In operation, WCDs 110-114 include various voice, messaging, email, web browsing, gaming, file sharing, and other applications that require a wireless network to provide the desired operations. These operations require various quality of service levels to provide the uplink and downlink communications on the wireless device. For example, a voice communication may require a higher quality of service than an instant messaging application. Consequently, LTE access node 120 may be provided with processes that dictate how communication resources, such as resource blocks, time slices, and the like, are provided to each of the devices to ensure the devices are capable of completing the desired communication.

In addition to determining the resources that are provided to the devices, LTE access node 120 may direct the wireless devices to transmit communication status information to LTE access node 120. This communication status information includes a power headroom (PHR) value indicative of how much relative power is left to transmit data in addition to the power being used in the current transmission. The PHR value is transmitted at intervals by each of WCDs 110-114, wherein the intervals are scheduled by LTE access node 120 based on current signal service quality attributes associated with the connected wireless devices. These signal service quality attributes for the connecting WCDs may include packet errors for the connecting devices, packet loss for the connecting devices, jitter for the connecting devices, latency for the connecting devices, or some other similar network signal service quality for the connecting wireless devices, including combinations thereof.

In at least one example, LTE access node 120 may provide a first PHR timer to all connecting WCDs 110-114 and monitor the signal service quality for the wireless devices. Once it is determined that the current signal service quality for devices in the network is inadequate based on predefined performance criteria, LTE access node 120 may identify a subset of WCDs 110-114 based on the communication service type for the subset of WCDs. This service type may be determined based on the Quality of Service Class Identifier (QCI) associated with the subset of devices, an access point name (APN) associated with the subset of devices, a Uniform Resource Locator (URL) associated with the wireless communication devices, a guaranteed bit rate (GBR) associated with the wireless devices, or any other similar communication service type determination. After the devices are identified, LTE access node 120 may provide the subset of devices with a second PHR timer, permitting the devices to report PHR values at different intervals than the first PHR timer.

Figure 2:
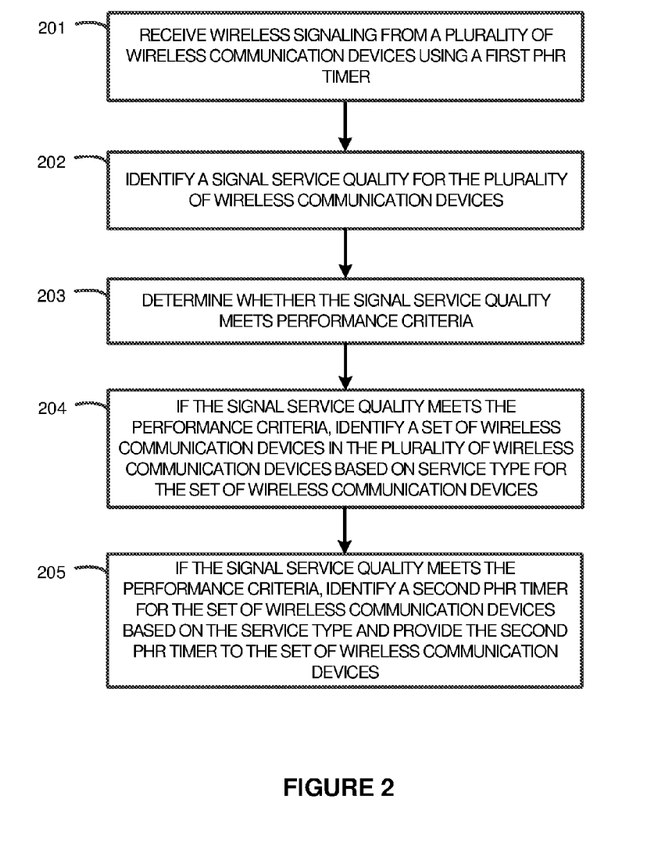
FIG. 2 illustrates a method of operating a Long Term Evolution access node to modify headroom timers based on service types for wireless communication devices.

To further demonstrate the operations of LTE access node 120 from FIG. 1, FIG. 2 is provided. FIG. 2 illustrates a method of operating LTE access node 120 to modify headroom timers based on service types for wireless communication devices. The operations of FIG. 2 are referenced parenthetically in the paragraphs that follow with reference to systems and elements from communication system 100 of FIG. 1.

As described in FIG. 1, WCDs 110-114 communicate wireless signals with LTE access node 120, and LTE access node receives the wireless signaling from WCDs 110-114 using a first PHR timer (201). This PHR timer may include a PHR prohibit timer, which specifies the minimum number of packets that must be transmitted by each device between PHR values, and/or may include a PHR path loss value that can trigger a PHR transmission when the downlink path loss for a wireless device passes a defined threshold. While receiving the wireless signaling from WCDs 110-114, LTE access node 120 identifies a signal service quality for the plurality of WCDs 110-114 (202), and determines whether the signal service quality meets predefined performance criteria (203). The signal service quality may include a variety of factors including, but not limited to, packet errors, packet loss, jitter, or latency for the communications with WCDs 110-114. Once the various service factors are determined for the wireless devices, the factors may be compared to predefined criteria to determine whether the signal service quality meets performance criteria. For example, the packet loss between the wireless devices and LTE access node 120 may reach an undesirable volume.

If the signal service quality for the plurality of WCDs 110-114 meets the performance criteria, LTE access node 120 identifies a set of wireless devices in the plurality of WCDs 110-114 based on at least one service type for the set of wireless devices (204). This identification of the set of wireless devices is based on the communication services associated with the particular set of wireless devices. In particular, the set of wireless devices may be determined based on at least one QCI associated with the set of wireless devices, at least one APN associated with the set of wireless devices, a GBR qualification for the set of wireless devices, a URL associated with the set of wireless devices, or any other similar communication service classification for the wireless devices. For example, LTE access node 120 may identify all wireless devices from WCDs 110-114 that are allocated GBR for their communication. These communications may include Voice over Long Term Evolution (VoLTE) communications, real-time gaming communications, or any other similar communication that is allocated a GBR. In other examples, one or more QCIs, APNs, or other similar service traits for the WCDs may be used to identify the appropriate set of devices.

In addition to determining the set of wireless devices when the signal service quality meets the performance criteria, LTE access node 120 identifies a second PHR timer for the set of wireless devices based on the at least one service type, and provides the second PHR timer to the set of wireless devices (205). For example, LTE access node 120 may identify all of the devices that are allocated a GBR from WCDs 110-114, and determine a new PHR timer for the identified devices based on the GBR requirement. This new timer may permit the devices to more frequently transmit PHR values to LTE access node 120, improving the communication quality for the identified set of wireless devices. Accordingly, if LTE access node 120 determined that the signal service quality for WCDs 110-114 were inadequate based on predefined criteria, providing a new timer to the GBR devices may permit the GBR devices to more frequently adjust their signaling based on current PHR values.

In some implementations, in addition to providing a first set of the wireless devices with a modified PHR timer, LTE access node 120 may identify a second modified PHR timer for a second set of devices, wherein the second modified PHR timer counteracts the PHR signaling for the first set of devices. For example, LTE access node 120 may identify a first set of wireless devices that require GBR communications and provide the first set of devices with a lesser PHR timer than an original PHR timer. This lesser PHR timer may comprise a lesser PHR prohibit timer and/or a lesser PHR path loss value than the original PHR timer. As the modified timer is determined for the first set of devices, LTE access node 120 may identify a second set of wireless devices, wherein the second set of devices does not include devices from the first set. Once the second set is identified, LTE access node 120 may determine a second PHR timer that can be provided to the second set of wireless devices, wherein the second PHR timer counters the increased signaling generated by the lesser PHR timer provided to the first set of devices. In particular, the second set of devices may be provided with a PHR timer that is higher or increased from the original PHR timer provided to all devices, wherein the PHR timer may include a higher PHR prohibit timer and/or a higher PHR path loss value than the original PHR timer provided to all devices.

Figure 3A:
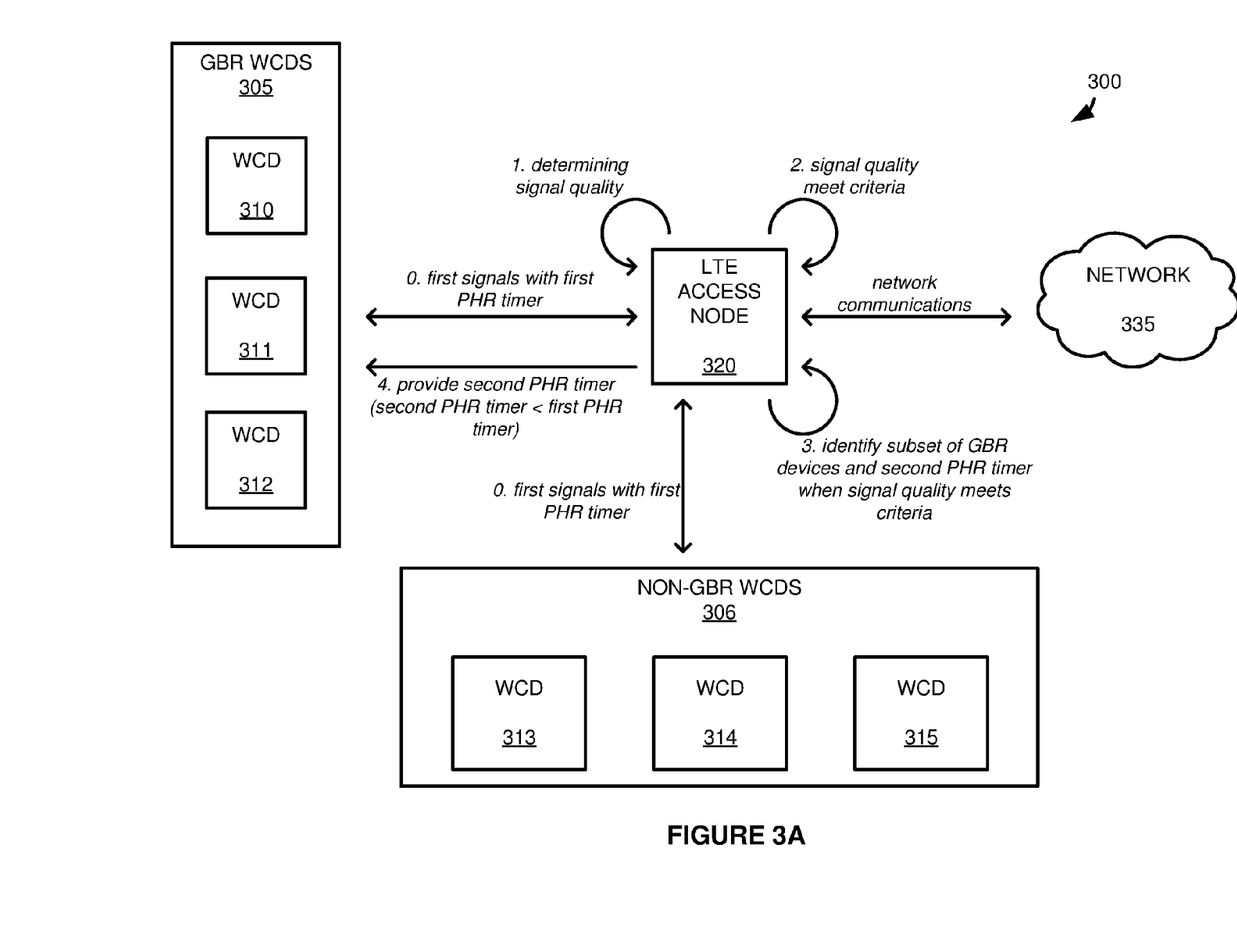
FIG. 3A illustrates an operational scenario of modifying power headroom timers based on service types for wireless communication devices according to one implementation.
Figure 3B:
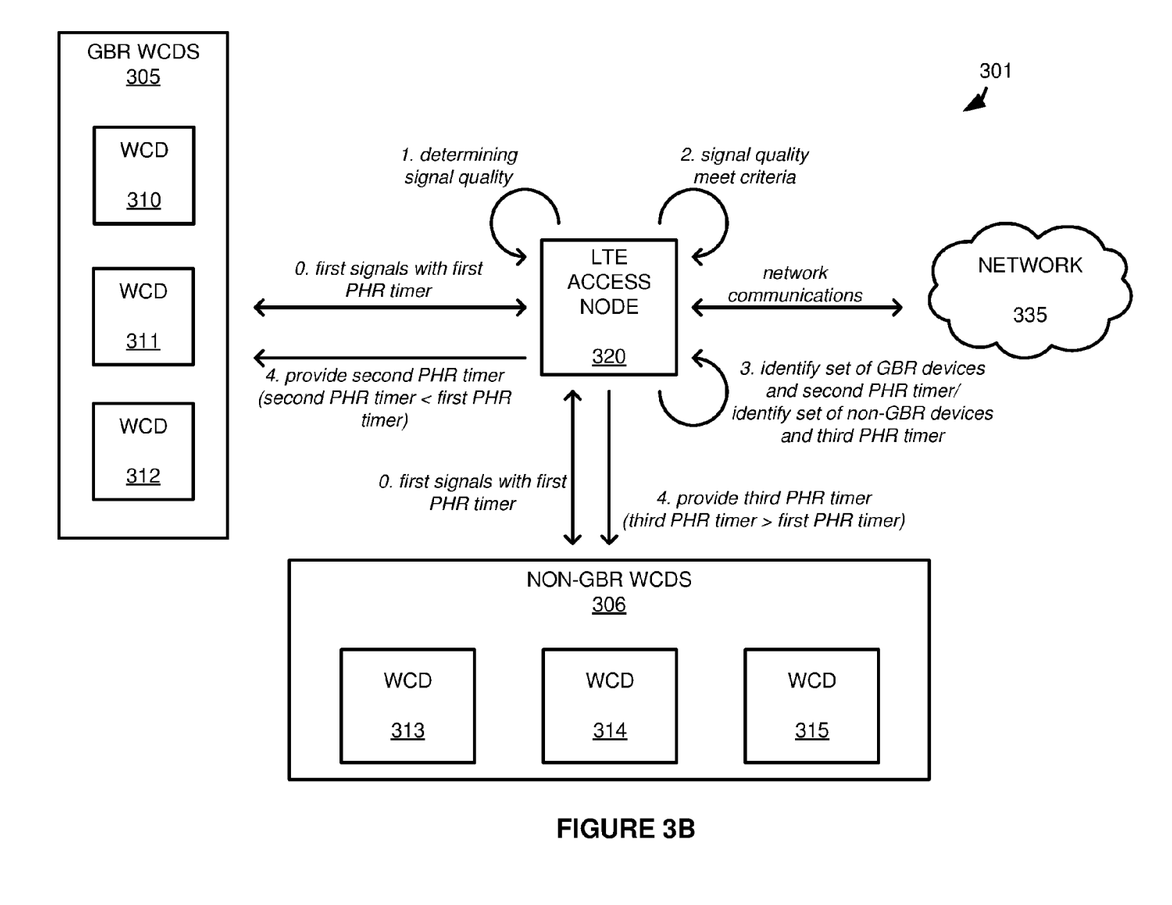
FIG. 3B illustrates an operational scenario of modifying power headroom timers based on service types for wireless communication devices according to one implementation.

FIGS. 3A and 3B illustrate operational scenarios 300 and 301 of modifying power headroom timers based on service types for wireless communication devices according to one implementation. FIGS. 3A and 3B include GBR WCDs 305, non-GBR WCDs 306, LTE access node 320, and network 335. GBR WCDs 305 includes WCDs 310-312 that are representative of wireless devices communicating using services or applications associated with a GBR. Non-GBR WCDs 306 includes WCDs 313-315 that are representative of wireless devices communicating using services or applications that are not associated with a GBR. LTE access node 320 is communicatively coupled to one or more gateways and routers of network 335 to provide communication services to WCDs 310-315.

Referring first to FIG. 3A, LTE access node 320 provides wireless communication services to WCDs 310-315, wherein each of the devices may require a different quality of service depending on the application or service involved in the communication. In the present example, the wireless devices are divided into two groups, a first group of devices that require GBR communications, and a second group of devices that do not require GBR communications. Although illustrated with two groups in the present example, it should be understood that any number of divisions of devices may be determined based on the application or communication service required by the devices.

In the present implementation, at step 0, LTE access node 320 communicates first signals with GBR WCDs 305 and non-GBR WCDs 306 using a first PHR timer for both classifications of devices. This first PHR timer may comprise a default timer that is used when network conditions are determined to be adequate for all communicating devices with LTE access node 120. During the communication of the first signals with WCDs 310-315, LTE access node 320, at step 1, determines a signal service quality for the communications with the wireless devices. This signal service quality may include, but is not limited to, packet errors, packet loss, jitter, or latency for the communications with WCDs 310-315. Based on the signal quality determination, LTE access node 320, at step 2, determines if the signal service quality meets performance criteria for the communications. If the signal service quality fails to meet the criteria, LTE access node 320 will continue to communicate with WCDs 310-315 using the first PHR timer.

In contrast, if the signal service quality is determined to meet the performance criteria, LTE access node 320 identifies, at step 3, a subset of GBR devices from WCDs 310-315 and further identifies a second PHR timer for the GBR devices. Once the set of devices and the second PHR timer is identified, the PHR timer is provided to the set of WCDs at step 4. In the present implementation, LTE access node 320 identifies GBR WCDs 305 including WCDs 310-312 to provide a second PHR timer, wherein the second PHR timer permits WCDs 310-312 to provide additional PHR values to LTE access node 320 than would otherwise be possible using the first PHR timer. For example, the first PHR timer may include a first PHR prohibit timer of forty packets. Once the signal service quality for the devices meets the required criteria, LTE access node 320 may provide GBR WCDs 305 with a second PHR prohibit timer of twenty packets, permitting the devices to more frequently update LTE access node 320 with power headroom information for the subset of devices.

Turning to FIG. 3B, FIG. 3B and operational scenario 301 illustrates many of the same operations described in operational scenario 300 from FIG. 3A. In particular, operational scenario 301 includes the same steps 0, 1, and 2 from operational scenario 300 in FIG. 3A. However, in addition to identifying a PHR timer for the set of GBR WCDs 305, LTE access node 320 further identifies an additional PHR timer for non-GBR WCDs 306, at step 3. This third timer, which is different than the second timer that is provided to the GBR devices, permits LTE access node 320 to balance the additional signaling that is provided to the GBR devices. For example, when LTE access node 320 identifies the second PHR timer for GBR WCDs 305, the second timer permits the devices to more frequently provide PHR values to LTE access node 320. To compensate for the additional signaling provided to the GBR devices, LTE access node 320 will limit the amount of PHR signaling that is provided to other devices. Thus, while the second PHR timer for the GBR devices permits the GBR devices to more frequently transmit PHR values, the third PHR timer that is identified for the non-GBR devices will permit the non-GBR devices to less frequently transmit PHR value to LTE access node 320.

Once the timers are identified for the devices communicatively couple to LTE access node 320, LTE access node 320, at step 4, will provide the second and third PHR timers to the corresponding devices. Accordingly, as illustrated in operational scenario 301, WCDs 313-315 are provided with the third PHR timer that is higher or larger than the first PHR timer that was provided to all of the devices, and WCDs 310-312 are provided with the second PHR timer that is smaller or less than the first PHR timer that was provided to all devices.

Although illustrated in the examples of FIGS. 3A and 3B using two set of devices, it should be understood that any number of sets may be used to define the modified PHR timers when the signal service quality meets the required criteria. For example, rather than using GBR to determine the sets of devices, it should be understood that the QCI values associated with the communications may be used to define the varying sets of communication devices. Thus, rather than two groups, the devices may be divided into any number of groups identifiable via the QCI values associated with the communications.

Figure 4:
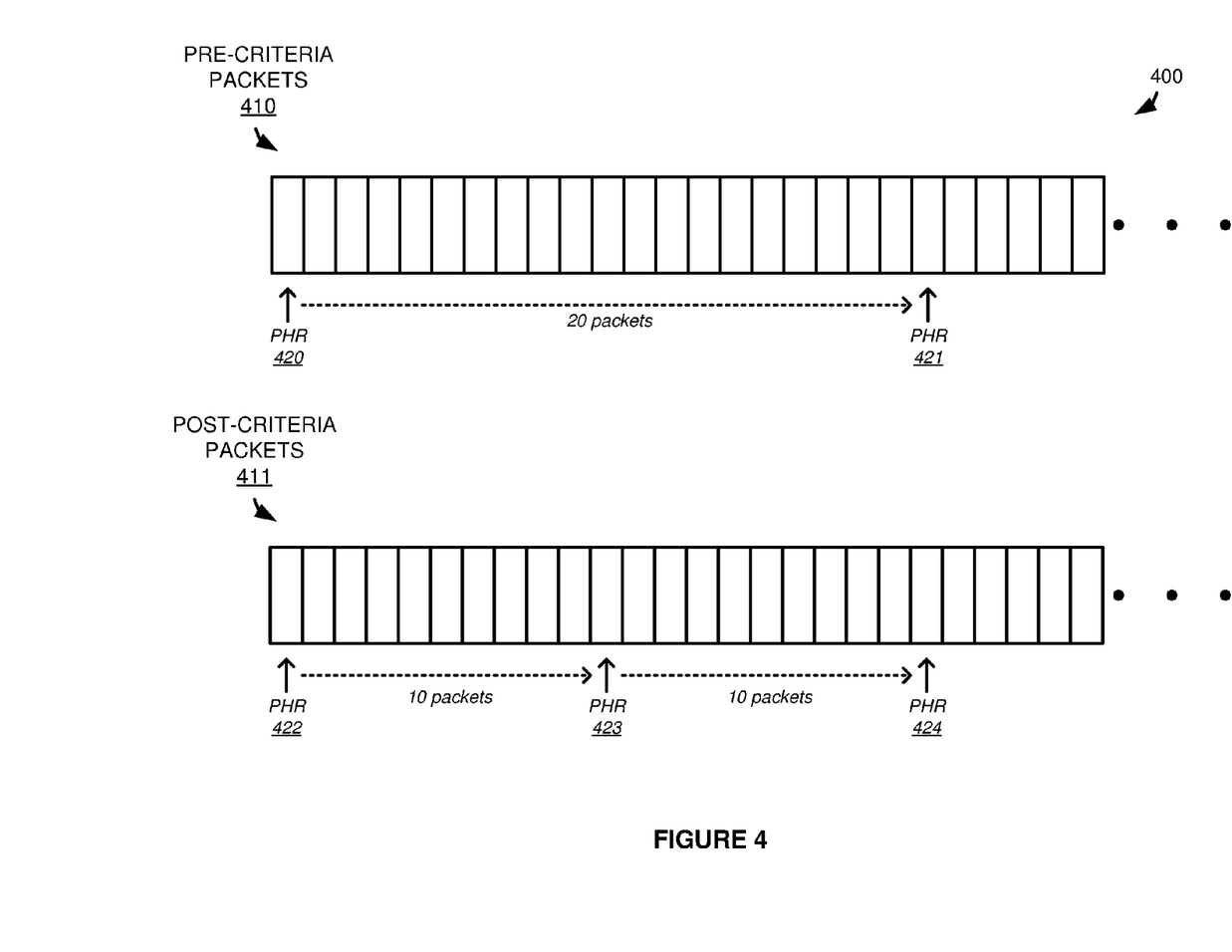
FIG. 4 illustrates an overview of modifying packet transmission for a wireless communication device based on a service type associated with the wireless communication device.

FIG. 4 illustrates an overview 400 of modifying packet transmission for a wireless communication device based on a service type associated with the wireless communication device. Overview 400 includes pre-criteria packets 410, post criteria packets 411, and PHR values 420-424.

In operation, a LTE access node will provide wireless communication devices communicatively coupled to the node with a PHR timer that specifies when the wireless devices may communicate PHR values to the LTE access node. This PHR timer may include a PHR prohibit timer and/or a PHR path loss value that can be used to trigger the transmission of PHR values to the LTE access node. Here a first PHR timer provided to a wireless device includes a PHR prohibit timer that limits the transmission of PHR values to every twentieth packet. Consequently, as demonstrated in pre-criteria packets 410, PHR value 421 is transferred twenty packets after the transmission of PHR value 420.

During the communication with the devices, the LTE access node will monitor the signal service quality that is provided to the communicating wireless devices. This signal service quality may include the packet loss, packet errors, jitter, or any other similar measurement of the signal quality with the wireless devices, including combinations thereof. Once the signal service quality meets predefined criteria, the LTE access node may identify a set of wireless devices communicating with the node, and further identify a second PHR timer to be provided to the set of wireless devices. As described herein, the set of wireless devices is determined based on at least one service type allocated to the set of wireless devices. This service type may be defined by the APN for the set of wireless devices, one or more QCIs associated with the set of wireless devices, a GBR requirement for the set of wireless devices, or any other similar service type identification.

In the present implementation, the identified set of wireless devices is provided with a new PHR timer that permits the devices to more frequently transmit PHR values to the LTE access node. As a result, post-criteria packets 411, which are representative of the transmission of data packets for a device within the identified set of devices, transmits additional PHR packets than pre-criteria packets 410. In particular, PHR packets 422-424 are transmitted every tenth packet, rather than every twentieth packet represented in pre-criteria packets 410. This permits devices within the identified set of devices to transmit PHR values more frequently to more efficiently request changing resources from the LTE access node.

Although illustrated in the example of overview 400 as decreasing the PHR timer for a set of wireless devices, it should be understood that similar principles may be used to increase the PHR timer for a second set of wireless devices. For example, if a first set of wireless devices is identified to be provided with a lesser PHR timer than an originally provided PHR timer, a second set of wireless devices may be provided with a higher PHR timer than the originally provided PHR timer. This second set of wireless devices may be used by the LTE access node to balance the additional signaling that is permitted by the first set of wireless devices. Accordingly, referring to overview 400, the second set of devices may be provided with a PHR prohibit timer of forty packets to counter the PHR timer of ten packets provided to the first set of wireless devices.

Figure 5:
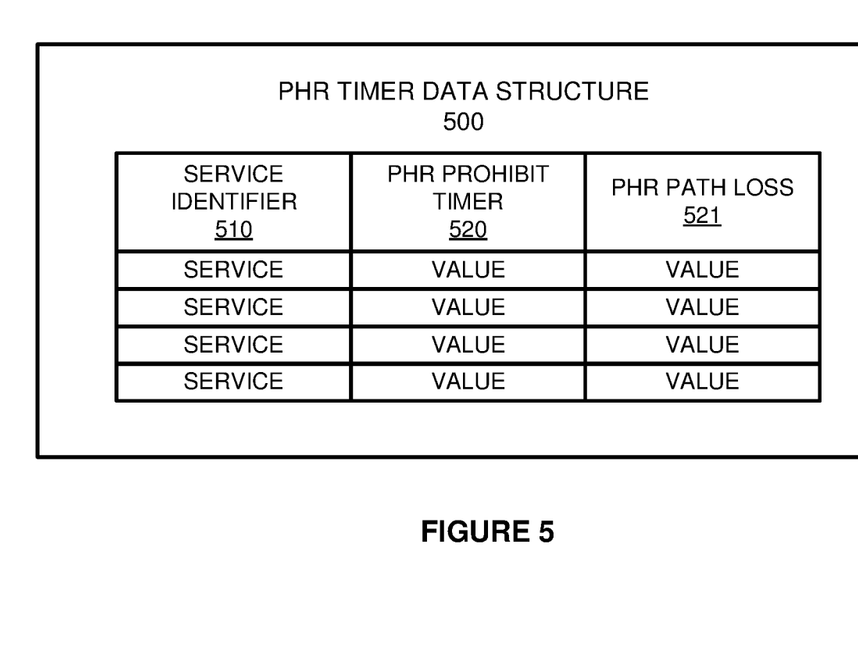
FIG. 5 illustrates a packet headroom timer data structure to assist in determining PHR timers according to one implementation.

FIG. 5 illustrates a PHR timer data structure 500 to assist in determining PHR timers according to one implementation. PHR timer data structure 500 is illustrated as a table in the present example, although it should be understood that the data structure may comprise an array, linked list, tree, or any other similar data structure or structures for use in a LTE access node. PHR timer data structure 500 includes columns for service identifier 510, PHR prohibit timer 520, and PHR path loss 521.

As described herein, a LTE access node may provide WCDs communicating via the LTE access node with a first PHR timer, wherein the PHR timer may include a first PHR prohibit timer and/or a first PHR path loss value. During the first communication signals with the WCDs, the LTE access node identifies whether the signal service quality for the signals meets defined criteria, wherein the criteria may be used to indicate that the signal quality is poor for the communicating devices. Once the LTE access node determines that the signal service quality meets the defined criteria, the LTE access node identifies a set of devices in the communicating WCDs based on a service type for the set of devices, and determines a second PHR timer to be provided to the set of devices.

Here, to determine the second PHR timer to be provided to the set of identified devices, the LTE access node may use PHR timer data structure 500. In particular, based on the service associated with the devices, the LTE access node may identify a PHR prohibit timer and PHR path loss value to be allocated to the set of devices. This service identifier for the set may comprise one or more QCI values associated with the set of devices, a GBR requirement for the set of devices, an application associated with the set of devices, a URL associated with the set of devices, at least one APN associated with the set of devices, or any other similar service identifier for a set of devices. Once the service identifier is determined, the service may then be used to identify PHR prohibit timer values and PHR path loss values from PHR prohibit timer column 520 and PHR path loss column 521. After the values are identified for the set of devices, the LTE access node may provide the values to the set of devices as a second PHR timer to replace the first PHR timer. In some implementations, this providing of the new PHR timer to the devices may comprise a Radio Resource Control (RRC) Re-Configuration Message to update the timer values on the device.

As an illustrative example, LTE access node may identify a set of devices with a QCI of one, wherein the QCI of one is associated with voice communication. Once the service identifier is determined for the set of devices with the QCI of one, the LTE access node may identify a PHR prohibit value and PHR path loss value based on the service identifier, and provide the new values to the set of devices via an RRC Re-Configuration Message.

Although illustrated herein as updating devices currently coupled with the LTE access node, it should be understood that LTE access node may also provide PHR values to newly connecting devices based on the service type for a communicating device. In particular, once the LTE access node determines that different service types should receive different PHR values, LTE access node may receive a communication request from a new wireless device. Once the communication request is received, the LTE access node may identify a service type associated with the request, and identify a PHR timer associated with the service type. After the PHR is determined, the LTE access node may transfer the PHR timer to the requesting device, permitting the device to transmit PHR values based on the provided timer. In some examples, the PHR timer is transferred via a RRC Configuration Message for the requesting wireless device.

Figure 6:
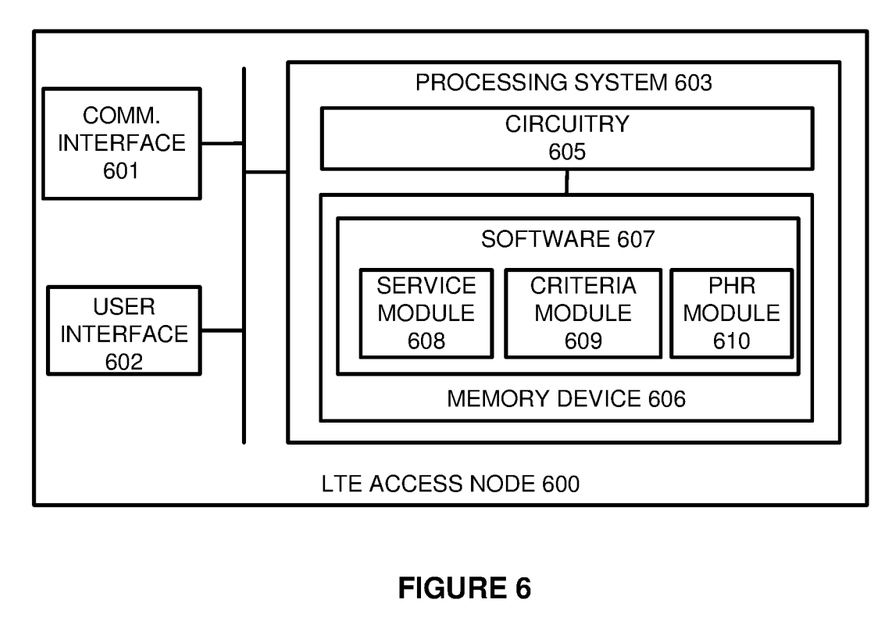
FIG. 6 illustrates a Long Term Evolution access node to modify headroom timers based on service types for wireless communication devices.

FIG. 6 illustrates a Long Term Evolution access node to modify headroom timers based on service types for wireless communication devices. LTE access node 600 is representative of any computing system or systems with which the various operational architectures, processes, scenarios, and sequences disclosed herein for a LTE access node may be implemented. LTE access node 600 is an example of LTE access node 120 and 320, although other examples may exist. LTE access node 600 comprises communication interface 601, user interface 602, and processing system 603. Processing system 603 is linked to communication interface 601 and user interface 602. Processing system 603 includes processing circuitry 605 and memory device 606 that stores operating software 607. LTE access node 600 may include other well-known components such as a battery and enclosure that are not shown for clarity.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 may be configured to communicate with one or more routers and gateways of a LTE service provider network, and further configured to wirelessly communicate with a plurality of WCDs.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes service module 608, criteria module 609, and PHR module 610, although any number of software modules may provide the same operation. Operating software 607 may further include an operating system, utilities, drivers, network interfaces, applications, or some other type of software. When executed by processing circuitry 605, operating software 607 directs processing system 603 to operate LTE access node 600 as described herein.

In at least one implementation, service module 608 directs processing system 603 to exchange wireless signaling with WCDs using a first PHR timer, wherein the first PHR timer may include a PHR prohibit timer and/or a PHR path loss value. During the communication signals with the WCDs, service module 608 further directs processing system 603 to identify a signal service quality for the plurality of WCDs, the signal service quality comprising packet loss, jitter, latency, or any other similar signal service quality information for communicating wireless devices.

Based on the signal service quality information, criteria module 609 directs processing system 603 to determine whether the signal service quality meets defined criteria, wherein the defined criteria are used to determine when different service types should receive varying PHR timers. For example, if the signal service quality indicating that the devices were receiving a poor signaling, it may be desirable for the LTE access node to modify the PHR timer for specific communication service types, permitting the devices with the specific service types to more frequently update information about the PHR associated with the device.

Once the signal service quality meets the defined criteria, PHR module 610 directs processing system 603 to identify a set of wireless devices in the plurality of wireless devices based on a service type for the set of wireless devices, and further directs processing system 603 to identify a second PHR timer for the set of wireless devices based on the service type or types associated with the set of devices. This set of devices may be determined based on the QCIs associated with the set of devices, the APNs associated with the set of devices, the URL associated with the set of devices, or any other similar service type determination for the devices. After identifying the set of devices and the modified PHR timer for the set of devices, PHR module 610 may direct processing system 603 to provide the modified PHR timer to the set of devices.

For example, LTE access node 600 may identify a set of devices associated with QCIs that qualify for a GBR, and determine a PHR timer for the devices based on the GBR requirement. This PHR timer for the GBR devices may permit the GBR devices to more frequently provide PHR values to LTE access node 600 to improve signaling for the devices. Accordingly, where a first PHR timer may permit PHR values to be transferred every twenty packets, the second PHR timer associated with the set of GBR devices may permit PHR values to be transferred every ten packets. Thus, the second PHR timer is less than the first PHR timer that was provided to all devices.

Although illustrated in the previous example as updating the PHR timer for the identified set of wireless devices, it should be understood that LTE access node 600 may further be configured to identify service types for new incoming wireless connections. For example, once LTE access node 600 is configured to provide PHR timers based on the service types of the wireless devices, LTE access node 600 may receive a communication request from a new wireless device. Once the communication request is received, the LTE access node may identify a service type associated with the request, and identify a PHR timer associated with the service type. After the PHR is determined, the LTE access node may transfer the PHR timer to the requesting device, permitting the device to transmit PHR values based on the provided timer.

Returning to the elements of FIG. 1, WCDs 110-114 may each comprise Radio Frequency (RF) communication circuitry and an antenna. The RF communication circuitry typically includes an amplifier, filter, modulator, and signal processing circuitry. WCDs 110-114 may each include a user interface, memory device, software, processing circuitry, or some other communication components. WCDs 110-114 may each comprise a telephone, computer, e-book, mobile Internet appliance, wireless network interface card, media player, game console, or some other wireless communication apparatus.

LTE access node 120 may comprise radio frequency (RF) communication circuitry and at least one antenna to provide wireless communication services to WCDs 110-114. The RF communication circuitry typically includes an amplifier, filter, RF modulator, and signal processing circuitry. LTE access node 120 may comprise a router, server, memory device, software, processing circuitry, cabling, power supply, network communication interface, structural support, or some other communication apparatus. LTE access node 120 may comprise an eNodeB in at least one example.

Network 135 may comprise the wireless service provider network, the Internet, IMS, or some other network that provides data services to WCDs 110-114. Communication network 135 may comprise switches, wireless access nodes, Internet routers, network gateways, application servers, computer systems, communication links, or some other type of communication equipment—including combinations thereof.

Wireless signaling 146 uses wireless links that use the air or space as transport media for LTE communication format. Communication link 141 uses metal, glass, air, space, or some other material as the transport media. Communication link 141 could use various communication protocols, such as Time Division Multiplex (TDM), Internet Protocol (IP), Ethernet, communication signaling, wireless communication signaling, or some other communication format—including combinations thereof. Communication link 141 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a Long Term Evolution (LTE) access node to dynamically modify power headroom (PHR) timers, the method comprising:

receiving wireless signaling from a plurality of wireless communication devices using a first PHR timer;

identifying a signal service quality for the plurality of wireless communication devices based on the wireless signaling;

determining whether the signal service quality meets performance criteria;

if the signal service quality meets the performance criteria, identifying a set of wireless communication devices in the plurality of wireless communication devices based on at least one service type for the set of wireless communication devices; and if the signal service quality meets the performance criteria, identifying a second PHR timer for the set of wireless communication devices based on the at least one service type and providing the second PHR timer to the set of wireless communication devices.

2. The method of claim 1 wherein providing the second PHR timer to the set of wireless communication devices comprises transmitting a Radio Resource Control (RRC) Re-Configuration Message with the second PHR timer to the set of wireless communication devices.

3. The method of claim 1 wherein identifying a signal service quality for the plurality of wireless communication devices based on the wireless signaling comprises identifying at least one of packet errors, packet loss, jitter, or latency for the plurality of wireless communication devices based on the wireless signaling.

4. The method of claim 1 wherein identifying the set of wireless communication devices in the plurality of wireless communication devices based on the at least one service type for the set of wireless communication devices comprises identifying the set of wireless communication devices in the plurality of wireless communication devices based on at least one quality of service class identifier (QCI) associated with the set of wireless communication devices.

5. The method of claim 1 wherein identifying the set of wireless communication devices in the plurality of wireless communication devices based on the at least one service type for the set of wireless communication devices comprises identifying the set of wireless communication devices in the plurality of wireless communication devices that qualify for guaranteed bit rate (GBR) communications.

6. The method of claim 1 wherein identifying the set of wireless communication devices in the plurality of wireless communication devices based on the at least one service type for the set of wireless communication devices comprises identifying the set of wireless communication devices in the plurality of wireless communication devices based on at least one access point name (APN) for the set of wireless communication devices.

7. The method of claim 1 wherein identifying the set of wireless communication devices in the plurality of wireless communication devices based on the at least one service type for the set of wireless communication devices comprises identifying the set of wireless communication devices in the plurality of wireless communication devices based on at least one Uniform Resource Locator (URL) for the set of wireless communication devices.

8. The method of claim 1 wherein identifying the second PHR timer for the set of wireless communication devices based on the at least one service type comprises identifying the second PHR timer for the set of wireless communication devices based on the at least one service type, wherein the second PHR timer is less than the first PHR timer.

9. The method of claim 8 further comprising:

if the signal service quality meets the performance criteria, identifying a second set of wireless communication devices that do not qualify for the set of wireless communication devices; and if the signal service quality meets the performance criteria, identifying a third PHR timer for the second set of wireless communication devices and providing the third PHR timer to the second set of wireless communication devices, wherein the third PHR timer is more than the first PHR timer.

10. The method of claim 1 wherein the first PHR timer comprises at least a first PHR prohibit timer or a first PHR path loss value, and wherein the second PHR timer comprises at least a second PHR prohibit timer or a second PHR path loss value.

11. An apparatus to dynamically modify power headroom (PHR) timers, the apparatus comprising:

at least one non-transitory computer readable media; and processing instructions stored on the at least one non-transitory computer readable media that, when executed by a processing system, direct the processing system to:

receive wireless signaling from a plurality of wireless communication devices using a first PHR timer;

identify a signal service quality for the plurality of wireless communication devices based on the wireless signaling;

determine whether the signal service quality meets performance criteria;

if the signal service quality meets the performance criteria, identify a set of wireless communication devices in the plurality of wireless communication devices based on at least one service type for the set of wireless communication devices; and if the signal service quality meets the performance criteria, identify a second PHR timer for the set of wireless communication devices based on the at least one service type and providing the second PHR timer to the set of wireless communication devices.

12. The apparatus of claim 11 wherein the processing instructions to provide the second PHR timer to the set of wireless communication devices direct the processing system to transmit a Radio Resource Control (RRC) Re-Configuration Message with the second PHR timer to the set of wireless communication devices.

13. The apparatus of claim 11 wherein the processing instructions to identify a signal service quality for the plurality of wireless communication devices based on the wireless signaling direct the processing system to identify at least one of packet errors, packet loss, jitter, or latency for the plurality of wireless communication devices based on the wireless signaling.

14. The apparatus of claim 11 wherein the processing instructions to identify the set of wireless communication devices in the plurality of wireless communication devices based on the at least one service type for the set of wireless communication devices direct the processing system to identify the set of wireless communication devices in the plurality of wireless communication devices based on at least one quality of service class identifier (QCI) associated with the set of wireless communication devices.

15. The apparatus of claim 11 wherein the processing instructions to identify the set of wireless communication devices in the plurality of wireless communication devices based on the at least one service type for the set of wireless communication devices direct the processing system to identify the set of wireless communication devices in the plurality of wireless communication devices that qualify for guaranteed bit rate (GBR) communications.

16. The apparatus of claim 11 wherein the processing instructions to identify the set of wireless communication devices in the plurality of wireless communication devices based on the at least one service type for the set of wireless communication devices direct the processing system to identify the set of wireless communication devices in the plurality of wireless communication devices based on at least one access point name (APN) for the set of wireless communication devices.

17. The apparatus of claim 11 wherein the processing instructions to identify the second PHR timer for the set of wireless communication devices based on the at least on the at least one service type direct the processing system to identify the second PHR timer for the set of wireless communication devices based on the at least one service type, wherein the second PHR timer is less than the first PHR timer.

18. The apparatus of claim 17 wherein the processing instructions further direct the processing system to:

if the signal service quality meets the performance criteria, identify a second set of wireless communication devices that do not qualiy for the set of wireless communication devices; and if the signal service quality meets the performance criteria, identify a third PHR timer for the second set of wireless communication devices and provide the third PHR timer to the second set of wireless communication devices, wherein the third PHR timer is more than the first PHR timer.

19. The apparatus of claim 11 wherein the first PHR timer comprises at least a first PHR prohibit timer or a first PHR path loss value, and wherein the second PHR timer comprises at least a second PHR prohibit timer or a second PHR path loss value.

* * * * *